United States Patent [19]

Williams

[11] Patent Number: 4,503,835

[45] Date of Patent: Mar. 12, 1985

[54] CHARCOAL BRIQUET LIGHTER

[76] Inventor: Wiley Williams, Rte. 2, Box 173, Auburn, Ala. 36830

[21] Appl. No.: 565,401

[22] Filed: Dec. 27, 1983

[51] Int. Cl.³ .............................................. A24C 1/16
[52] U.S. Cl. .................................. 126/25 B; 126/9 R; 126/9 A
[58] Field of Search ....................... 126/25 B, 9 R, 9 A

[56] References Cited

U.S. PATENT DOCUMENTS

| | | | |
|---|---|---|---|
| 2,834,661 | 5/1958 | Chaplin | 126/25 B |
| 3,116,704 | 1/1964 | Byars et al. | 126/25 B |
| 3,296,984 | 1/1967 | Durfee | 126/25 B |
| 3,727,979 | 4/1973 | Schier et al. | 126/9 A |

Primary Examiner—Carroll B. Dority, Jr.
Attorney, Agent, or Firm—Newton, Hopkins & Ormsby

[57] ABSTRACT

A combustible readily ignitable rectangular container is erected from its originally flat folded state and inserted into a free-standing octagonal vented metal ignition sleeve resting on a grill surface. Crumpled paper is placed within the bottom of the ignition sleeve beneath pivoted vertically swinging grate members thereof and below the bottom of the combustible charcoal container. The quantity of charcoal briquettes is dumped directly from a briquette package into the combustible container to fill the same. The crumpled paper is ignited, which in turn ignites the combustible container and the charcoal briquettes in an efficient manner. After a short interval, a handle member is inserted through apertures of the metal ignition sleeve and the latter is bodily lifted from the grill surface to dump the ignited charcoal briquettes thereon, the vertically swinging grate members swinging downwardly to permit the dumping of the burning briquettes.

11 Claims, 10 Drawing Figures

CHARCOAL BRIQUET LIGHTER

BACKGROUND OF THE INVENTION

Many and diverse types of charcoal briquette igniting devices are known in the prior art. These devices vary in their relative complexities, costs, efficiencies of operation and convenience of usage. The general objective of this invention is to improve on the known prior art by providing a charcoal briquette igniting and handling system which is more convenient and safer to use, quicker and more efficient in the operation of igniting the coals, more versatile, cleaner, and more adaptable to modern-day compact packaging.

In its essentials, the present invention consists of an outer free-standing preferably octagonal sturdy sheet metal ignition sleeve consisting of connected panels which can be readily separated and nested for packaging and shipment. The ignition sleeve possesses igniting and ventilating openings near its bottom as well as lifting handle receptor openings near its top. A horizontal diagonally extending brace rod somewhat above the bottom of the ignition sleeve serves to strengthen the sleeve while forming a support and locator member for the bottom of a combustible preferably rectangular container or liner for a quantity of charcoal briquettes which is placed in the ignition sleeve after being erected from an originally folded flat state. Free swinging pivoted grate members near the bottom of the ignition sleeve and pivotally attached thereto yield upwardly and engage the diagonal brace when crumpled paper is placed in the bottom of the ignition sleeve for igniting through one of the lower draft openings of the sleeve. The grate members swing freely downwardly to near vertical positions to permit the dumping of hot coals onto a grill surface by lifting the ignition sleeve through the use of a lifting handle inserted through upper openings of the ignition sleeve following a brief ignition interval. During the ignition interval, the grate members rest on the grill surface in nearly horizontal positions to receive and support ignited briquettes which descend onto the grate members by gravity following burning of the inserted combustible charcoal briquette container which is formed of treated paper.

Various additional features and advantages of the invention will become apparent to those skilled in the art during the course of the following description.

DETAILED DESCRIPTION

Figure 1:
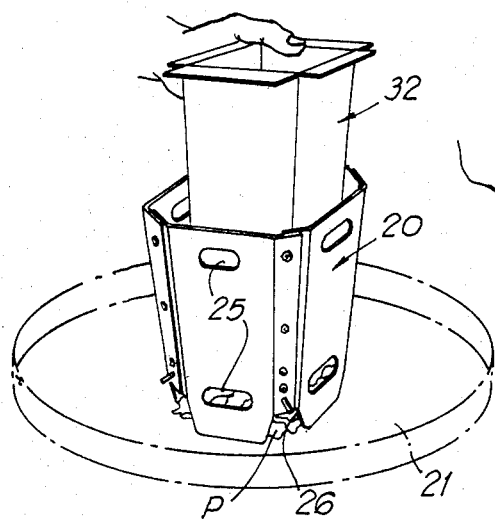
FIG. 1 is a perspective view of a charcoal briquette igniting and handling system according to the present invention, showing a first step in the use of the system.
Figure 2:
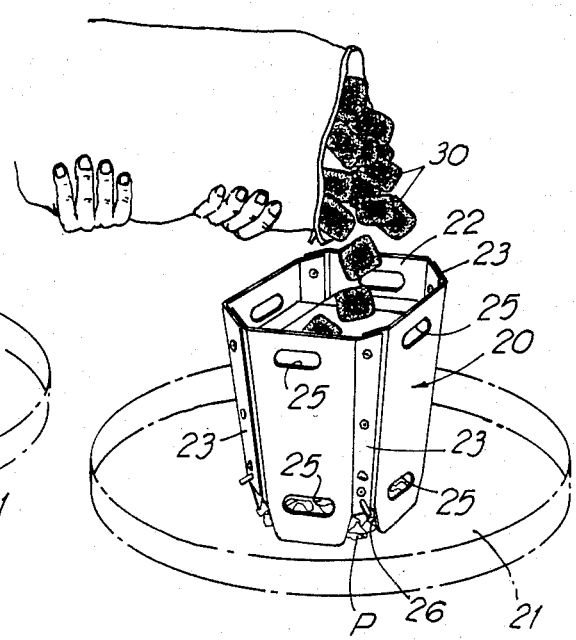
FIG. 2 is a further perspective view showing a further step in the use of the system.

Referring to the drawings in detail wherein like numerals designate like parts, a charcoal briquette igniting and handling system according to the present invention comprises an outer sturdy sheet metal free standing ignition sleeve 20 adapted to rest on any supporting grill surface 21 during use. The ignition sleeve 20 is octagonal, open-ended and somewhat tapered toward its lower end. It consists of four separate panel sections 22, identically constructed, and each having opposite side longitudinal angled flanges 23 which overlap in the assembled sleeve to define the four comparatively narrow sides of the octagonal ignition sleeve. The flanges 23 are separably connected by suitable fasteners 24. In this connection, the four panels 22 of the ignition sleeve can be separated and nested for compact packaging and storage together with other removable and folding components of the system, yet to be described.

Figure 5:
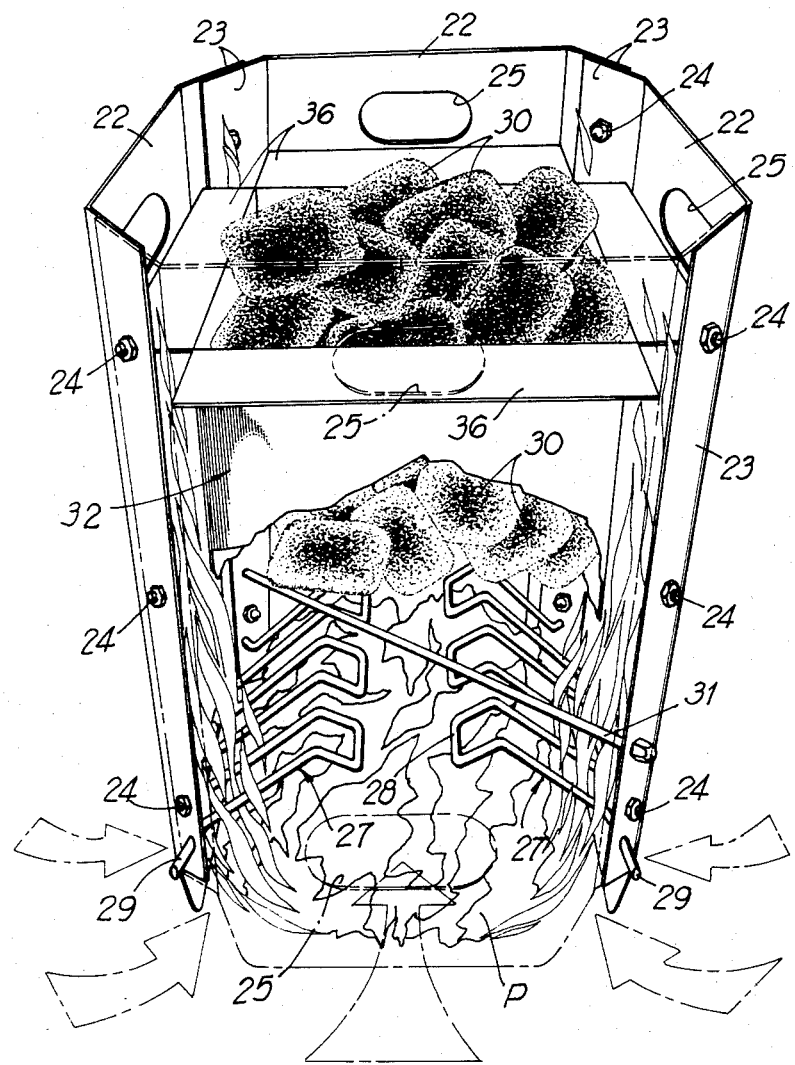
FIG. 5 is an enlarged perspective view, parts omitted, showing burning of a combustible charcoal briquette container within the metallic outer ignition sleeve and showing pivoted grill members in their initially raised positions at the beginning of ignition.

Each panel 22 has a pair of upper and lower slots 25 formed therethrough near the top and bottom of the ignition sleeve for purposes to be described. The ignition sleeve is also notched at its bottom adjacent to the flanges 23 as shown at 26 to further promote an updraft of combustion air through the system, such air also entering through the lower openings 25, as depicted by the broken line directional arrows in FIG. 5.

Figure 6:
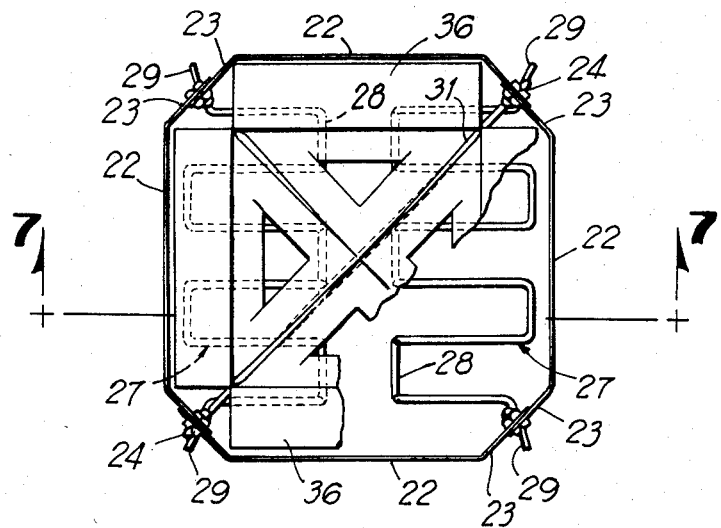
FIG. 6 is a fragmentary plan view of the system.
Figure 7:
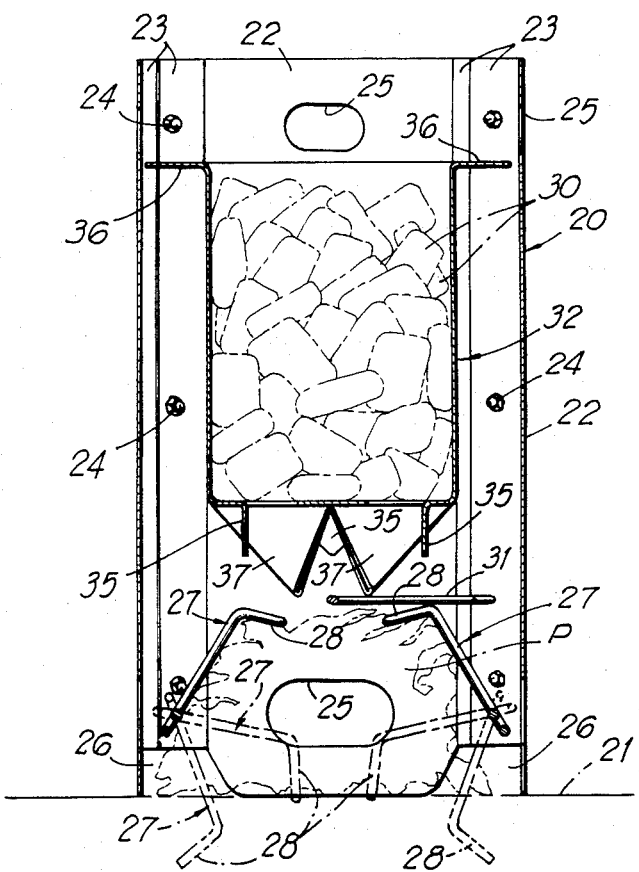
FIG. 7 is a vertical section taken on line 7—7 of FIG. 6.

Within the bottom portion of the sheet metal ignition sleeve are a pair of opposing pivoted vertically swingable grate members 27 formed from heavy wire into multiple spaced loops 28 which loops are formed in planes roughly perpendicular to the remaining portions of the pivoted grate members. The two pivoted grate members, FIG. 6, extend substantially across the bottom of the ignition sleeve and have opposite end extensions or trunnions 29 which are received through apertures of the flanges 23 to define pivots for the swinging grate members. Because of the springiness of the wire grate members 27, the elements 29 are removably snapped into the apertures of the flanges 23 and can be separated therefrom for ready packaging. As best shown in FIG. 7, the profiles of the grate members 27 are approximately L-shaped, the loops 28 thereof being adapted to rest solidly on the grill surface 21 and support the charcoal briquettes 30 during the ignition process, to be further described. Also shown in FIG. 7 are elevated and depending or dumping positions of the grate sections 27, which positions will be further explained.

Somewhat above the elevations of the grate pivot elements 29, a single diagonal internal brace rod 31 spans the ignition sleeve across a pair of its narrower corners. The brace rod 31 serves several purposes in the invention. It strengthens the metal ignition sleeve during usage. It forms a support for a combustible charcoal briquette container 32, yet to be described, when the latter is placed within the ignition sleeve; it forms a limit stop for the upward swinging of the grate members 27, FIG. 7; and it assists in the distribution or guidance of the descending burning coals as they are delivered onto the grill surface 21 by lifting of the metal ignition sleeve, as will be further described. The brace 31 also serves to divide the ignition sleeve 20 into bottom and upper ignition chambers.

A second major component of the invention comprises a prefabricated folded easily erectable combustible container 32 preferably formed of a solid bleached sulfate-polyethylene paper stock coated on both sides. The material is similar to that commonly used for packaging liquids, such as milk.

Figure 8:
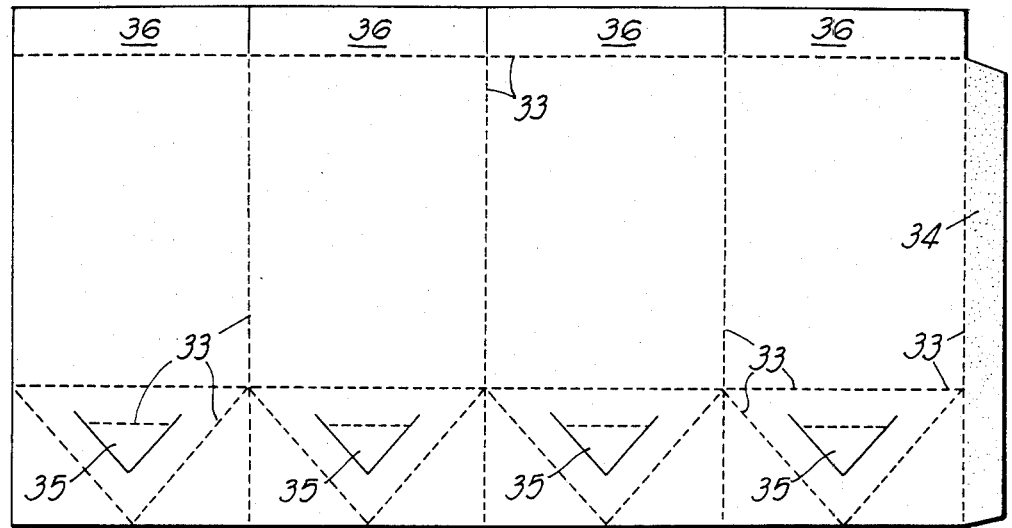
FIG. 8 is a plan view of a foldable blank embodied in a combustible container for charcoal briquettes.
Figure 9:
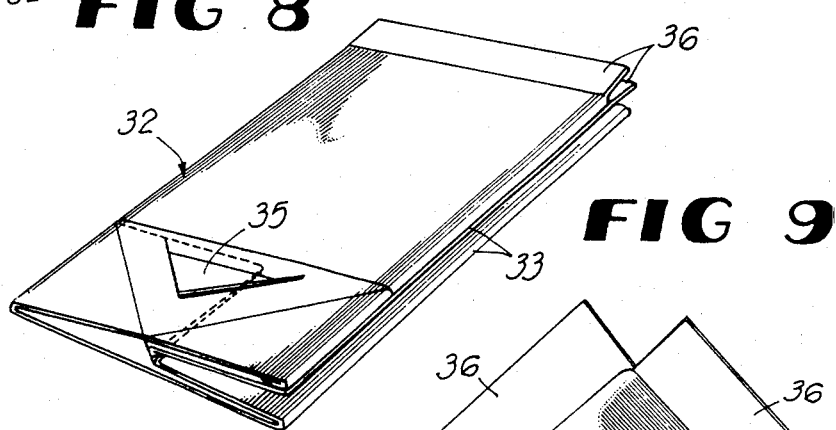
FIG. 9 is a perspective view of the combustible container in a flat folded state.
Figure 10:
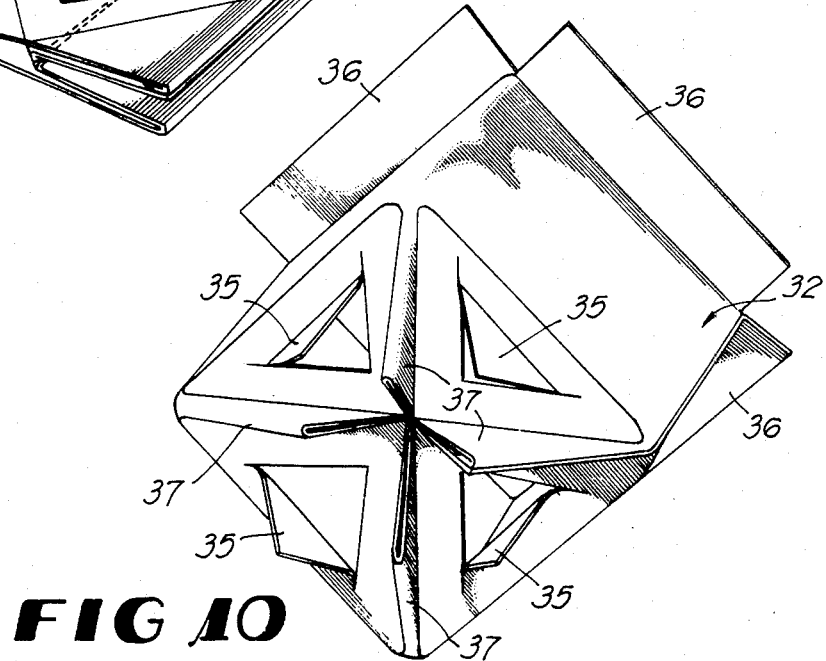
FIG. 10 is a perspective view of the container in an erected use state.

Referring to FIG. 8, the container 32 is formed from a flat substantially rectangular blank 32' having folding lines 33 as indicated. An adhesive-coated flap 34 is provided at one end of the blank. Four triangular tabs 35 are cut in the blank near one side thereof. Portions forming flaps 36 are provided on the opposite side of the blank 32'. The blank 32' is foldable for packaging into a substantially flat compact rectangular form, FIG. 9, whereby several of the combustible charcoal briquette containers can be included in a package along with the ignition sleeve 20, with the latter in a knocked-down nested condition, as previously explained. A plurality of convenient tear-off igniter elements is also included in each package containing the system.

The folded combustible container is easily erected or expanded by hand into the open top rectangular shape shown in FIGS. 9, 1, 5 and 7. The bottom of the expanded container 32 is pushed upwardly by hand to form a pyramid bottom having four depending double thickness stiffening gussets 37 which engage and rest on the diagonal brace 31 during the use of the system. The triangular tabs 35 are bent downwardly to form generous draft openings through the bottom of the container 32 to promote combustion of the charcoal by a chimney effect. The flaps 36 are folded outwardly so as to be out of the way, FIG. 5.

As shown in FIG. 1, the erected container 32 is placed downwardly inside of the assembled sheet metal sleeve 20 whose lower end rests solidly on the grill surface 21. Such grill surface can be a solid surface or an open mesh type grill surface formed of heavy welded wire.

With the container 32 supported on the brace rod 31 and thereby held well above the bottom of the ignition sleeve 20, crumpled newspaper P is stuffed into the bottom of the sleeve 20 beneath the container 32, and such action raises the grate members 27 on their pivots to the solid line elevated positions of FIG. 7 where the grate member contact the brace 31 which serves as a stop.

Charcoal briquettes 30 from a regular commercial package are poured into the top of ignition sleeve 20 which will accept approximately 3½ pounds of briquettes, a customary amount for many grilling operations. The ignition sleeve 20 is filled to the brim. Therefore, in FIGS. 5 and 7 the container 32 is shown as partially filled to reveal the construction of the container 32.

Figure 3:
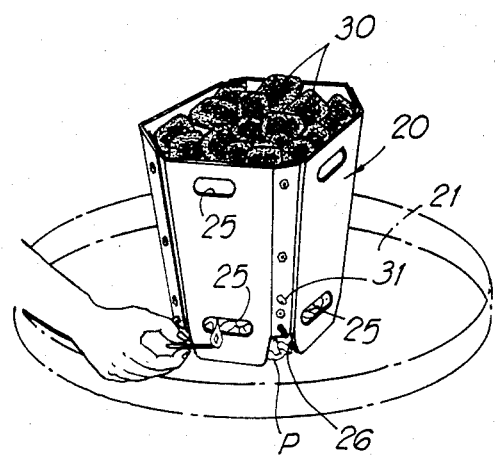
FIG. 3 is a perspective view showing the initial igniting step.

As shown in FIG. 3, the crumpled paper P is ignited through one of the lower draft openings 25 of the sleeve 20. The burning paper will quickly ignite the bottom of the combustible container 32 and the latter will rapidly burn and ignite the coals 30 whose burning will be accelerated by a strong updraft through the lower openings 25 and corner notches 26, which cause a chimney effect. As the container 32 disintegrates due to burning, the hot coals will gravitate downwardly on opposite sides of the brace 32 which forms a splitter for the coal. Prior to this, the grate members 27 will have descended by gravity due to the complete burning of the paper P, and their angled loops 28 will rest solidly on the grill surface 21, in the intermediate broken line positions shown in FIG. 7. In these next level positions, the grate members will support the burning charcoal briquettes somewhat above the bottom of the sleeve 20.

At this time, if necessary, an additional charge of briquettes 30 can be introduced into the top of the sleeve to produce a larger coal bed on the grill surface.

Figure 4:
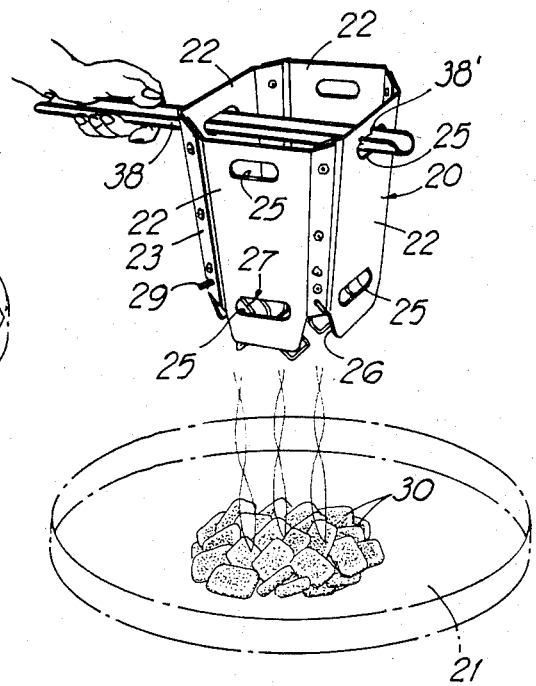
FIG. 4 is a further perspective view depicting the lifting of the ignition sleeve and simultaneous depositing of burning briquettes on a grill surface.

After about twelve minutes from the start of ignition, a provided channel-shaped metal handle, 38, FIG. 4, having upwardly opening opposed notches 38', is placed horizontally through two of the upper openings 25 of sleeve 20 so that the notches are aligned with the edge of the distant opening 25 and the handle 38 is lifted so that notches 38' receive a portion of wall 22 and the sleeve is lifted straight up from the grill surface 21, thereby gently and cleanly depositing the hot coals 30 in a compact pile on the grill surface 21. The pivoted grill members 27 swing downwardly by gravity as the sleeve 20 is lifted from the grill surface to the generally vertical depending positions shown in FIG. 7, whereby they do not impede the discharge of the coals from the bottom of the sleeve.

Prior to the described lifting of the sleeve 20 in FIG. 4, the paper container 32 will have been totally consumed, and after lifting to discharge the coals onto the grill surface, the metal sleeve 20 is clean and ready for reuse with a fresh combustible container 32.

It will be understood that while it is preferrable to use the container 32 for lighting the charcoal, only newspaper and/or lighter fluid could be substituted for the container 32, if desired.

The system is simple, convenient and safe. It is economically beneficial in that its use leads to a much more efficient use of charcoal briquettes in correct quantities and in a more complete and even burning thereof.

Finally, the handle 38 also forms an effective tool for scraping the grill surface and can also serve as a screwdriver to tighten screws used in the assembling of the sleeve 20.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A charcoal briquette igniting and handling system comprising an exterior non-combustible ignition sleeve adapted to be placed upright on a grill surface, a pair of opposing parallel pivot axis freely vertically swingable grate members on and within said sleeve near its lower end, a support member and brace connected within the sleeve near and above the swingable grate members and forming a limit stop for the upward movement of the grate members, a combustible container for charcoal briquettes including draft openings adapted for placement within the ignition sleeve and engaging and resting on said support member and brace, and a lifting handle member for said ignition sleeve insertable through openings thereof on opposite sides of said sleeve near its top, said grate members being swingable downwardly by gravity to generally level briquette supporting grill surface engaging intermediate positions and to depending nearly vertical briquette discharging positions.

2. A charcoal briquette igniting and handling system as defined in claim 1, and said ignition sleeve being formed of sheet metal and the combustible container being formed of treated paper.

3. A charcoal briquette igniting and handling system as defined in claim 2, and said ignition sleeve being constructed in a plurality of separable and nestable panel sections for compact storage and shipment, and said combustible container comprising a prefabricated and prefolded collapsed substantially flat container expandable by hand to an erected state for use in the system.

4. A charcoal briquette igniting and handling system as defined in claim 3, and said ignition sleeve being substantially octagonal and said panel sections being channel-like with flat panel body portions and opposite side longitudinal angled apertured flanges adapted to overlap adjacent flanges of other panel sections of the ignition sleeve and to be detachably secured thereto by fasteners placed through the apertures of said flanges.

5. A charcoal briquette igniting and handling system as defined in claim 3, and said combustible container and the panel sections of the ignition sleeve having draft opening means near their lower ends, said panel sections also having additional openings near their tops to receive said lifting handle member.

6. A charcoal briquette igniting and handling system comprising a free standing open-ended ignition sleeve formed of non-combustible material and having draft passages near its lower end, a pair of opposing freely vertically swingable grate sections rotationally journaled on the ignition sleeve near its lower end, a substantially horizontal brace member spanning the interior of the ignition sleeve above the elevation of the grate members and forming a stop for the upward movement of the grate members, and a totally consumable combustible container for charcoal briquettes having draft openings near its bottom and being insertable bodily through the top of the ignition sleeve to a position therein where the bottom of the container engages and is supported by said brace member.

7. A charcoal briquette igniting and handling system as defined in claim 6, wherein the ignition sleeve is constructed from a plurality of separable and nestable panel sections and said combustible container is constructed from a foldable blank which is prefabricated into a folded, collapsed substantially flat form which is erectable by hand into an open top stiff container having a vented bottom.

8. A charcoal briquette igniting and handling system as defined in claim 7, and said ignition sleeve and container each being polygonal in horizontal cross section.

9. A charcoal briquette igniting and handling system as defined in claim 6, and said grate sections being formed of wire and having multiple loops therein and end trunnions pivotally engageable in support apertures provided in the ignition sleeve.

10. A charcoal briquette igniting and handling system as defined in claim 9, and the loops of the grate members having interior angled portions rendering the grate members generally L-shaped, and the angled portions adapted to engage and rest on a grill surface, whereby the grate members are held in generally level briquette supporting positions near the bottom of the ignition sleeve.

11. A charcoal igniting and handling system comprising a knock-down free standing upright axis open-ended ignition sleeve formed of non-combustible material and having lower end draft passage means and upper end lifting means, opposing vertically swingable grate members rotatably journaled on the ignition sleeve near its lower end and being freely movable between elevated generally upright positions and depending free-hanging positions, whereby crumpled paper or the like can be stuffed into the bottom of the ignition sleeve and said grate sections will yield and swing upwardly to said generally upright positions and will be supported in such positions temporarily by said crumpled paper until the paper is burned and consumed, a combustible initially flat folded readily hand erectable combustible container for charcoal briquettes having lower end draft openings insertable bodily into the ignition sleeve and being supported within the sleeve somewhat above the elevation of the crumpled paper and elevated grate sections, whereby ignition and burning of the crumpled paper and subsequent ignition and burning of the combustible container will deliver briquettes by gravity onto the grate members when the latter have descended by gravity into supportive engagement with a grill surface, and a handle member for lifting the ignition sleeve and other diverse uses engageable with said upper end lifting means.

* * * * *